United States Patent [19]

Giardini

[11] Patent Number: 4,646,885
[45] Date of Patent: Mar. 3, 1987

[54] DUAL DRUM BRAKE ASSEMBLY

[75] Inventor: Dante S. Giardini, Dearborn Heights, Mich.

[73] Assignee: Ford Motor Company, Dearborn, Mich.

[21] Appl. No.: 689,523

[22] Filed: Jan. 7, 1985

[51] Int. Cl.⁴ .................. F16D 53/00; F16D 65/26; F16D 65/833; F16D 69/00
[52] U.S. Cl. ...................... 188/325; 188/78; 188/366; 188/250 A; 188/250 B; 188/216
[58] Field of Search ............ 188/75, 325, 78, 335, 188/365–367, 250 A, 250 B, 216

[56] References Cited

U.S. PATENT DOCUMENTS

| | | | |
|---|---|---|---|
| 1,511,976 | 10/1924 | Markham | 188/75 |
| 1,842,608 | 1/1932 | Hiatt | 188/216 |
| 1,906,737 | 5/1933 | Burgess | 188/335 |
| 1,983,251 | 12/1934 | Goodyear et al. | 188/216 |
| 2,087,062 | 9/1937 | McCauley | |
| 2,406,304 | 5/1943 | Levy | 188/264 F |
| 2,449,383 | 9/1948 | Hunter | 188/335 |
| 2,619,212 | 11/1952 | Cardwell et al. | 188/366 |
| 2,975,872 | 3/1961 | Lacy | 188/216 |
| 3,000,321 | 9/1961 | Parker | 103/53 |
| 3,007,555 | 12/1961 | Eames | 188/264 F |
| 3,044,579 | 7/1962 | Klaue | 188/216 |
| 3,123,527 | 3/1965 | Eakin | 188/367 |
| 3,170,542 | 8/1963 | Frayer | |
| 3,205,978 | 9/1965 | Blosele | 188/75 |
| 3,245,499 | 10/1963 | Kershner | |
| 3,342,290 | 12/1964 | Klaue | |
| 3,665,812 | 5/1972 | Hashimoto et al. | 188/365 |

FOREIGN PATENT DOCUMENTS

| | | | |
|---|---|---|---|
| 701692 | 1/1941 | Fed. Rep. of Germany | 188/367 |
| 528975 | 6/1955 | Italy | 188/75 |

Primary Examiner—Duane A. Reger
Assistant Examiner—James E. Barlow
Attorney, Agent, or Firm—Peter D. McDermott; Roger L. May

[57] ABSTRACT

A drum brake assembly is described to comprise a dual drum brake housing mounted to a vehicle wheel or shaft to be rotated therewith. The dual drum brake housing has two axially extending, concentric, radially spaced drum surfaces defining an annular channel between them. A torque member is fixed against rotation with the vehicle wheel and an expandable friction lining assembly is mounted to the torque member. The friction lining assembly is positioned within the annular channel and carries radially outward and radially inward facing friction linings. Upon expansion of the friction lining assembly each of the friction linings is moved into contact with the corresponding drum surface, thereby transferring braking force to the wheel.

19 Claims, 12 Drawing Figures

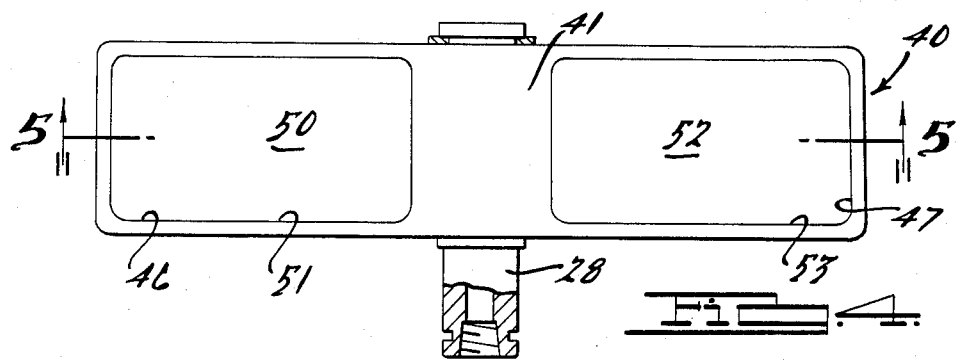
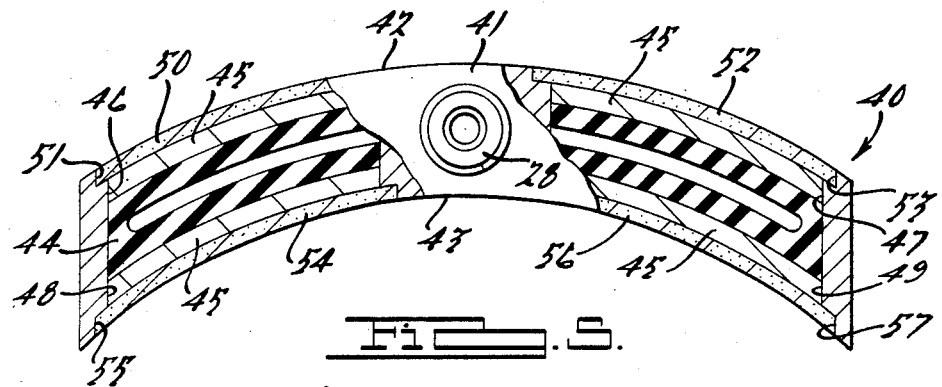
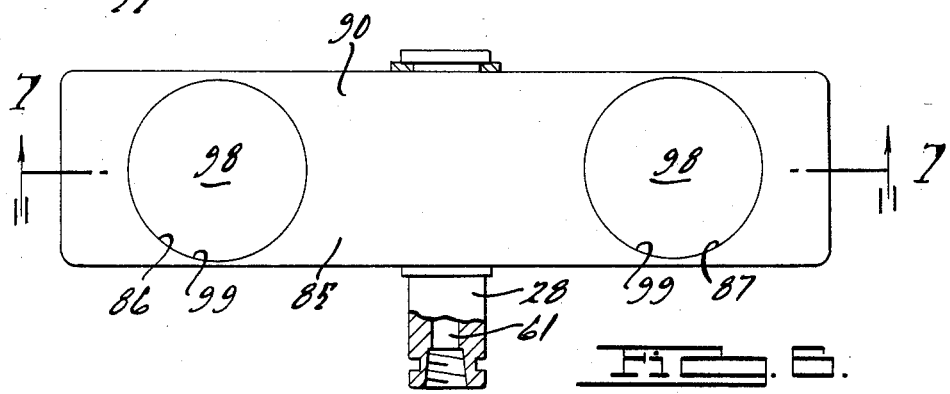
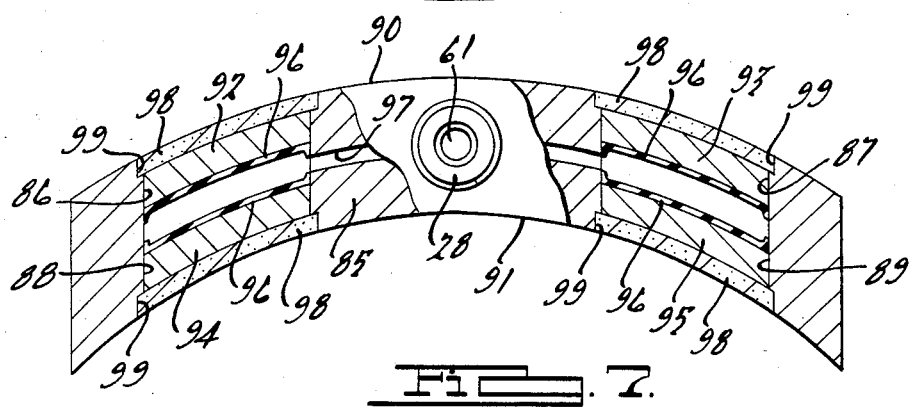

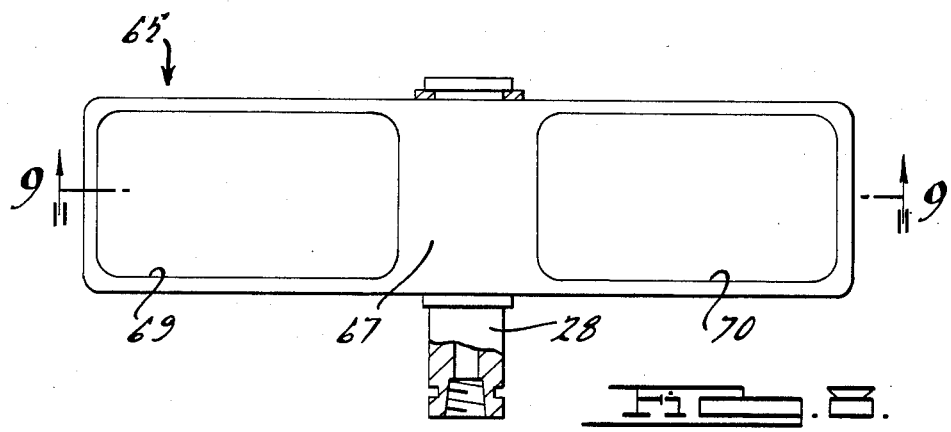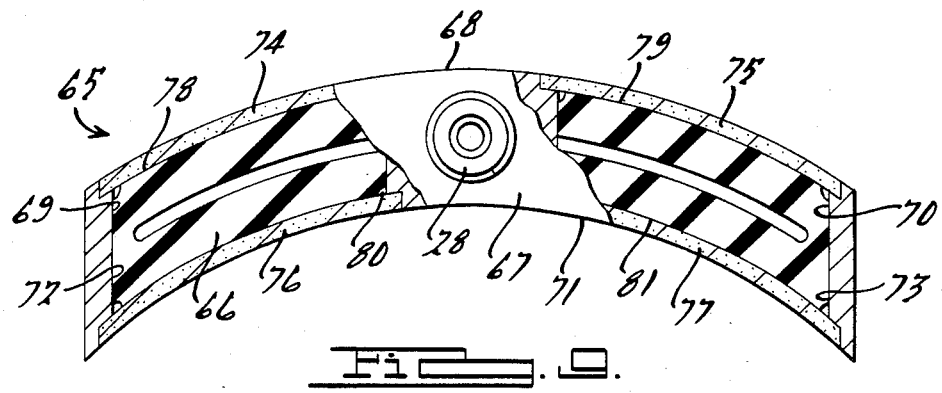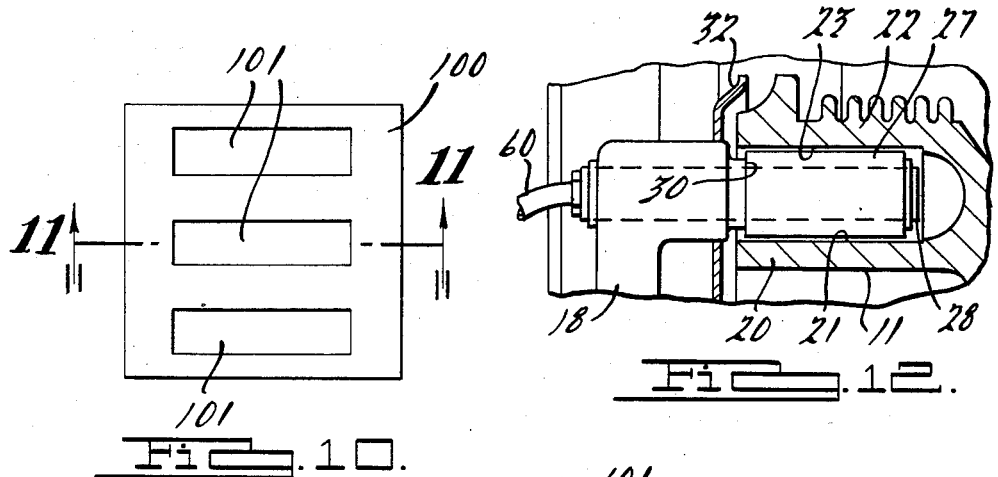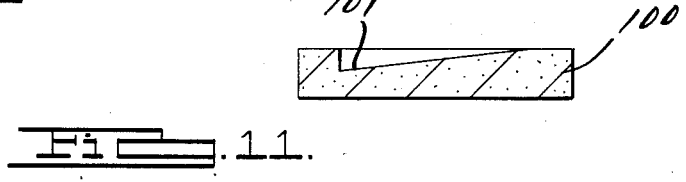

DUAL DRUM BRAKE ASSEMBLY

INTRODUCTION

This invention relates to drum brakes, particularly for motor vehicles, and, more particularly, to a novel dual drum assembly having significant weight reduction and heat dissipation advantages.

RELATED APPLICATION

This application is related to concurrently filed, commonly assigned patent application Ser. No. 689,522, entitled Dual Drum Brake Assembly With Cooling Means.

BACKGROUND OF THE INVENTION

An early brake drum is disclosed in U.S. Pat. No. 2,087,062 which shows a drum brake assembly in which the brake shoes are operated by fluid pressure actuated pistons. The brake shoes are connected to the pistons in such a manner as to permit a swiveling action against the brake drum. Also known are ring disc brakes such as that of U.S. Pat. No. 3,170,542, wherein a ring disc rotated with the vehicle wheel and a caliper was mounted to a nonrotating torque member. The caliper held friction linings in position on both sides of the rotating ring disc and was hydraulically actuatable to apply such friction linings against the surface of the rotating ring disc. Another brake arrangement is shown in U.S. Pat. No. 3,245,499, wherein axially spaced, radially extending annular friction surfaces were nonrotatably mounted on a fixed frame member in concentric relationship with respect to the wheel axle. Annular friction discs were rotatably mounted to the wheel axle between the aforesaid nonrotating annular friction surfaces. Expandable actuating discs were disposed between the friction discs. The actuating discs were spread by a cam action to apply the friction discs against the friction surfaces, thereby providing vehicle braking. A similar disc brake assembly is shown in U.S. Pat. No. 3,342,290, wherein opposed radially extending disc surfaces rotate with the vehicle wheel rim. Brake shoes are mounted within the space between the disc surfaces. Upon appliation of the brake, hydraulic pressure drives a wedge between the brake shoes causing the brake shoes to spread apart into contact with the disc surfaces.

Drum brake assemblies in current use typically comprise one or more brake shoes carrying friction linings mounted on a nonrotating backing plate which extends radially from the wheel axis. The brake shoes are adpated for reciprocal motion to contact and retract from a rotating drum surface. The brake shoes are operated by a wheel cylinder actuated by hydraulic or pneumatic pressure. Thus, upon actuation of the wheel cylinder the brake shoes and linings are forced against the drum, whereby braking forces are transmitted to the vehicle wheel. The drum surface is the inner surface of an annular flange extending axially from a radially extending wall or plate mounted to the vehicle axle. Since the circumference of the drum surface is dictated generally by the size of the vehicle wheel, in the past to provide more effective braking and to avoid the buildup of excessive heat upon braking, it has been known only to increase the drum surface by increasing its axial dimension. Consequently, however, to provide structural stability to avoid radial distortion of the drum surface upon application of pressure against it by the brake linings, known vehicle brake drums necessarily have been of relatively massive, heavy construction. That is, upon actuation of the brake, the brake drum must be sufficiently rigid to overcome distortion due to pressure by the friction linings against the drum surface, notwithstanding that the axial dimension of the drum surface acts effectively as a large moment arm. In addition, known brake assemblies are relatively complex, comprising numerous components including the brake shoe/lining assembly, wheel cylinders, adjusting levers, cables and cable guides, various biasing springs, and automatic brake shoe position adjusting means.

It is an object of the present invention to provide a drum brake assembly which is less complex in design and assembly than known drum brake assemblies.

Another object of the present invention is to provide an improved and simplified drum brake suitable for motor vehicles and having good heat dissipation properties.

A particular object of the invention is to provide a drum brake assembly of equal or better efficacy than conventional drum brake assemblies and yet providing a weight saving over such conventional drum brake assemblies. Additional aspects and advantages of the invention will be apparent from the drawings and following description thereof.

SUMMARY OF THE INVENTION

According to the present invention, a drum brake assembly comprises rotatably mounted dual concentric drums, the dual drums forming an annular channel in which an expandable friction lining assembly is nonrotatably mounted. More particularly, the invention provides a drum brake assembly comprising a dual drum brake housing mounted, for example, to a vehicle wheel or shaft to be rotatable therewith. The dual drum brake housing has two axially extending, concentric radially spaced drum surfaces defining an annular channel between them. A torque member is fixed against rotation with the dual drum brake housing and an expandable friction lining assembly is mounted to the torque member. The friction lining assembly is positioned within the aforesaid annular channel and comprises radially outward and radially inward facing friction linings. The friction lining assembly is adapted to receive fluid pressure, in response to which the assembly expands radially, that is, each of the friction linings is moved into contact with the corresponding (i.e., adjacent) drum surface, thereby transferring braking force to the dual drum brake housing.

For a more comprehensive understanding of the invention, reference is made to the following description of preferred embodiments thereof and the illustrations of same in the accompanying drawings.

DESCRIPTION OF THE DRAWINGS

In the accompanying drawings like characters refer to like parts throughout the several illustrations.

FIG. 4 is a plan view of one embodiment of the expandable friction lining assembly of the drum brake assembly of the invention.

FIG. 5 is a side elevation view of the friction lining assembly of FIG. 4 taken in partial cross-section through line V—V.

FIG. 6 is a plan view of another embodiment of the friction lining assembly of the dual drum brake assembly of the invention.

FIG. 7 is a side elevation view of the friction lining assembly of FIG. 6 taken in partial cross-section through line VII—VII.

FIG. 8 is a plan view of another embodiment of the friction lining assembly of the dual drum brake assembly of the invention.

FIG. 9 is a side elevation view of the friction lining assembly of FIG. 8 taken in partial cross-section through line IX—IX.

FIG. 10 is a plan view of a friction lining pad suitable for use in the expandable friction lining assembly of the invention.

FIG. 11 is a side elevation view of the friction lining pad of FIG. 10 taken in cross-section through line XI—XI.

FIG. 12 is a side elevation view broken away and partially in cross-section of the expandable friction lining assembly and torque member yoke to which it is mounted according to an alternative embodiment of the invention.

DETAILED DESCRIPTION OF PREFERRED EMBODIMENTS

In the following description, the invention is employed in the context of a motor vehicle wheel brake, for which use it is especially well suited. Directional references are made with reference to the wheel and axle with which the drum brake assembly is associated. Thus, the radially inner drum surface is closer to the axis of rotation of the wheel, that is, has a smaller diameter than the radially outer drum surface. It should be understood that the two drum surfaces are opposed, i.e., face each other, such that the radially inner drum surface faces radially outward while the radially outer drum surface faces radially inward. For purposes of discussion, it will be assumed that the annular channel defined by the dual drum surfaces, having a U-shaped cross-section, opens axially inward and that the dual drum brake and vehicle wheel are mounted axially outward of the torque member carrying the expandable friction lining assembly.

Figure 1:
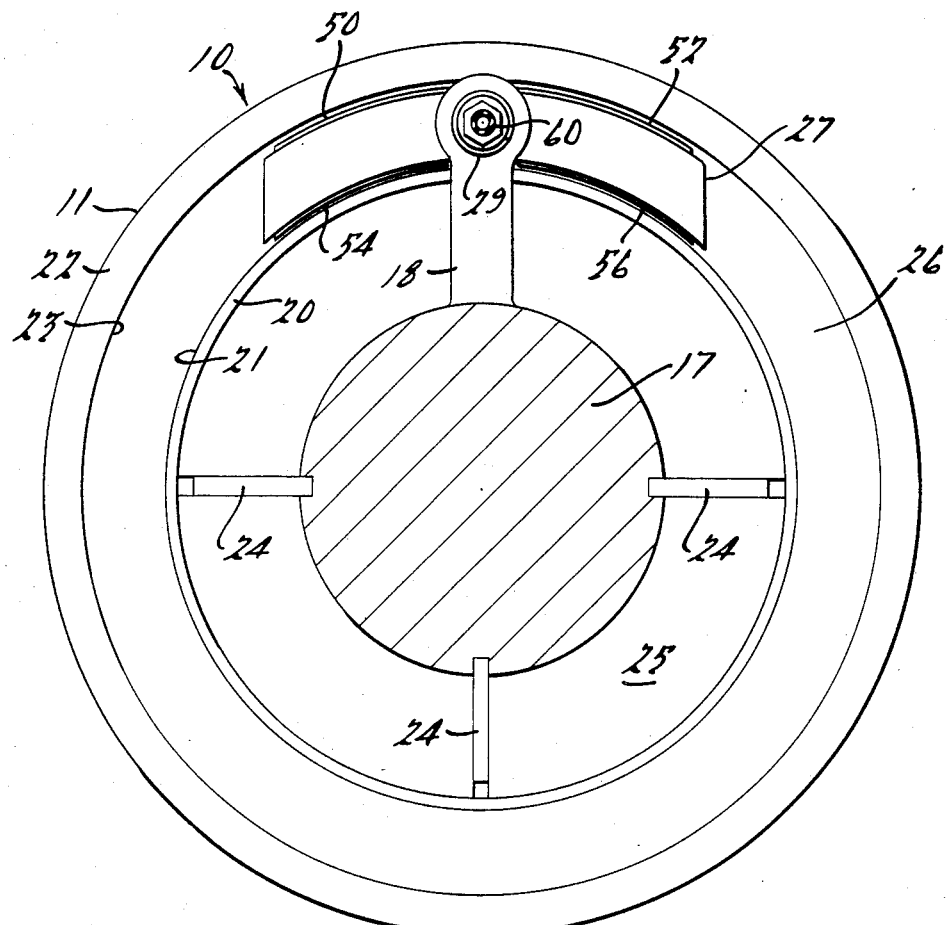
FIG. 1 is a rear elevation view, partially in cross-section, of a dual drum brake assembly according to one embodiment of the present invention.
Figure 2:
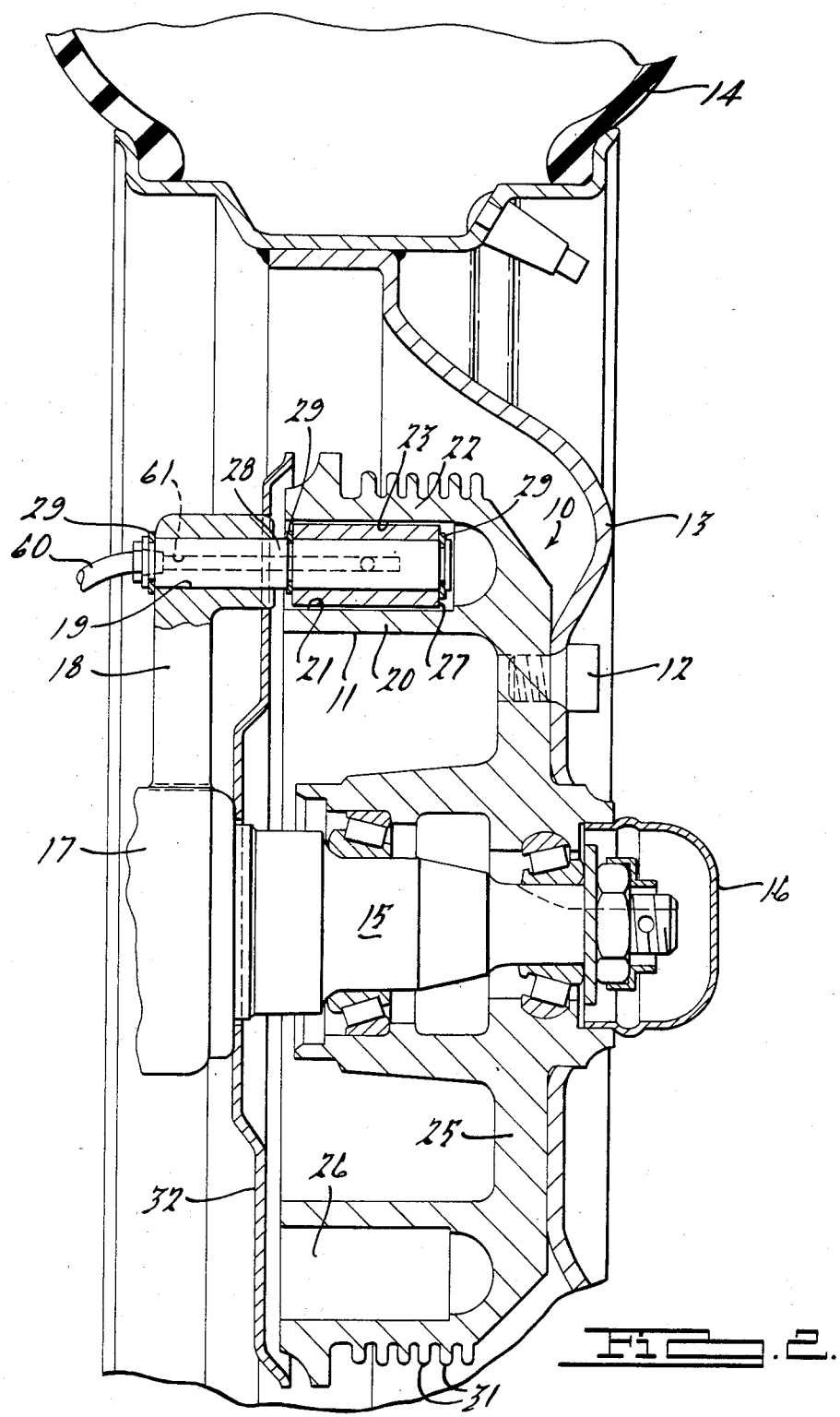
FIG. 2 is a partially cross-sectional view of a dual drum brake assembly according to the embodiment of FIG. 1, shown in assembly with a vehicle wheel and tire.

Referring now to FIGS. 1 and 2, a brake drum assembly 10 according to the invention is shown to comprise a dual drum brake housing 11 mounted by lugs 12 to vehicle wheel 13. The wheel carries tire 14 and is mounted on shaft 15 which terminates at hub 16. The shaft 15 is integral with spindle 17. Yoke 18 extends integrally from spindle 17 and provides axially extending bearing 19 at its terminus. Dual drum brake housing 11 provides axially extending inner annular drum or flange 20 having radially inner drum surface 21, and radially outer axially extending annular drum or flange 22 having radially outer drum surface 23. The dual drum brake housing preferably further provides strengthening ribs 24 extending integrally between the inner drum 20 and radially extending plate portion 25. It can be seen that the two concentric drum surfaces form an annular channel 26 between them. Expandable friction lining 27 is positioned within annular channel 26. The friction lining assembly is mounted to the torque member, i.e., spindle 17 and yoke 18, by means of shank 28 which is rotatably received in bearing 19 of yoke 18. Shank 28 is held in position in the yoke and in the friction lining assembly by means of snap rings 29. According to an alternative embodiment illustrated in FIG. 12, bearing 19 can extend axially to abut the friction lining assembly to serve as means to fix the position of the friction lining assembly against axial movement out of the annular channel. Thus, yoke 18 is seen in FIG. 12 to provide shoulder 30 adapted to bear against the friction lining assembly. It will be readily understood by the skilled of the art that as a matter of manufacturing convenience shank 28 could be formed integrally with friction lining assembly 27. Similarly, shank 28 could be formed integrally with yoke 18 and be rotatably received by the friction lining assembly.

To aid in dissipating heat generated during braking, one or both of the annular flanges forming the two concentric drum braking surfaces can provide cooling fins. Thus, as seen in FIG. 2, the outer annular flange provides cooling fins 31 which also serve to strengthen and to reinforce the outer flange. Although the inner annular flange 20 also can provide cooling fins, preferably a boot or dust cover 32 is provided which would limit the exposure to the atmosphere of cooling fins on such inner annular flange. Dust cover 32 serves to limit the amount of contamination infiltrating into the annular channel and thus, serves to protect and enhance the efficacy of the brake assembly. In this regard, it should be recognized that the dual drum structure of the present invention provides a significant advantage over currently known single drum brake assemblies regarding exposure of the brake assembly to dirt, water, etc. Specifically, the two drum braking surfaces of the dual drum assembly are far better isolated within the annular channel than would be either braking surface alone, without the opposite drum. The opposed braking surfaces are better isolated form dirt, water and other contamination than is the single drum surface of drum brake assemblies now widely used.

The expandable friction lining assembly employed in the dual drum brake assembly of the present invention can be any of several alternative embodiments, each of which performs substantially the same function to achieve the same result in substantially the same fashion. Referring to FIGS. 4 and 5, a friction lining assembly 40 is shown, comprising rigid housing 41 provided, for example, as an aluminum alloy casting according to well known fabrication methods. As seen in FIG. 5, the radially outer surface 42 and radially inner surface 43 are generally parallel to each other and curved so as to follow the curvature of the annular channel 26. Thus, when the friction lining assembly is in position in the annular channel the radially inner wall and radially outer wall each is substantially parallel to the adjacent portion of the corresponding drum surface. The friction lining assembly 40 further comprises an expandable elastomeric bladder 44 which extends circumferentially within the housing 41. Attached to the surface of the expandable bladder is a set of substantially rigid support discs 45 comprising, for example, aluminum alloy or the like. On the outer surface of each support disc is carried a friction lining pad comprising any of the various friction lining materials known to the skilled of the art. The radially outer wall 42 of the housing defines a first way 46 circumferentially forward of the shank 28 and a second way 47 circumferentially rearward of the shank. Similarly, the radially inner wall 43 of the housing defines a first way 48 circumferentially forward of the shank and a second way 49 circumferentially rearward thereof. According to the preferred embodiment shown in FIGS. 4 and 5, the housing also provides a recess in the surface of the inner and outer walls surrounding each of the ways and each of the friction lining pads is adapted to seat within a corresponding one of the recesses to be flush with the surface of the housing. Thus, friction lining pad 50 seats within recess 51 at way 46 in the radially outer wall 42 of the housing. Likewise, friction lining pad 52 seats within recess 53 at way 47 in the outer wall. Friction pads 54 and 56 seat within recess 55 and 57, respectively, in way 48 and 49, respectively, in radially inner wall 43 of the housing.

Upon actuation of the brake assembly, bladder 44 receives fluid pressure causing it to expand. Expansion of bladder 44 causes the friction lining pads to move outwardly from the housing into contact with the adjacent drum surface to effect braking. Greater fluid pressure applied to the bladder will result in correspondingly greater pressure of the friction lining pads against the brake drum surfaces. In this regard it should be recognized that the pressure applied against the radially inner (i.e. smaller) brake drum surface is substantially compressive pressure normal to a cylindrical surface. A cylindrical structure is able to withstand large forces under compression in a direction normal to its surface. Hence, the inner annular flange forming the inner brake drum surface can be of substantially lighter construction than if equal forces were to be applied against the opposite (i.e., inside) surface of the flange. In this way the present invention provides a lighter weight construction relative to the effective braking action provided in comparison with known single drum designs. In addition, an overall weight savings is provided in that the dual drum design is inherently more rigid than a single drum design, each of the drums or flanges acting to reinforce the structure. Thus, for this reason also the present dual drum assembly can be of lighter weight construction than a typical single drum assembly of equivalent braking efficacy. In addition, further weight savings can be realized in that the axial depth of the drum can be decreased without loss of braking efficacy simply by increasing the circumferential dimension of the expandable friction lining assembly. It also will be recognized by those skilled in the art that because the drum contact area is curved, the duo-self-servo (i.e. self-actuating in both rotational directions) feature of the friction linings of present single drum brake designs is retained in the dual drum brake assembly of the present invention. Also, because of such self-servo effect, less hydraulic pressure is required than would be with a comparable caliper disc brake. Yet another advantage of the present invention is seen in the ease of replacement of the operating components. Specifically, a worn or damaged friction lining assembly can be removed, either separately or together with the shank extending from the torque member, and a new assembly installed as a single unit. Thus, the simplicity of design of the present invention provides both ease of original assembly and, in addition, ease of replacement and repair of the brake assembly.

The fluid pressure applied to the expandable friction lining assembly can be either pneumatic fluid pressure such as from a pressurized air tank, or hydraulic fluid pressure such as from a brake master cylinder or other fluid pressure generating device. Referring again to FIG. 2, it can be seen that fluid pressure is delivered by hose 60 to a fluid pressure conduit 61 extending axially through shank 28. Fluid pressure conduit 61 is in fluid communication with the bladder 44. Of course, all connections should be substantially fluid tight connections for typical motor vehicle applications.

An alternative embodiment of the expandable friction lining assembly is illustrated in FIGS. 8 and 9, wherein friction lining assembly 65 comprises expandable elastomeric bladder 66 extending circumferentially within housing 67. The radially outer wall 68 of the housing defines a first way 69 circumferentially forward of shank 28, and a second way 70 circumferentially rearward thereof. The radially inner wall 71 defines a circumferentially forward way 72 and a circumferentially rearward way 73. The friction lining pads 74, 75, 76 and 77 are attached to the bladder 66 at pedestals, i.e. thickened wall sections 78, 79, 80 and 81, respectively, of the bladder. As in the case of the embodiment of FIGS. 4 and 5, the housing 67 of friction lining assembly 65 provides recesses to receive the friction lining pads, whereby the friction lining pads are flush with the surface of the housing when the brake is not being actuated.

Another alternative embodiment of the expandable friction lining assembly is illustrated in FIGS. 6 and 7, wherein housing 85 defines a set of cylindrical ways including circumferentially forward cylindrical way 86 and circumferentially rearward cylindrical way 87 in the radially outer wall 90, and circumferentially forward cylindrical way 88 and circumferentially rearward cylindrical way 89 in the lower, i.e. radially inner wall 91. According to this embodiment, the friction lining assembly does not comprise an expandable bladder within the housing 85. Rather, each of the aforesaid cylindrical ways is fitted with a piston 92, 93, 94 and 95, respectively. The pistons are slideably received in the ways and either are closely toleranced to form a fluid pressure-tight seal with the way or, preferably, are fitted with lip seals 96 to form a fluid pressure-tight seal. To the outer surface of each piston is attached a friction lining 98. Fluid pressure is admitted through the fluid pressure conduit 61 within shank 28 and from there is communicated through housing conduit 97 to the cylindrical ways to exert pressure outwardly against the cylindrical pistons to move the friction linings 98 into contact with the brake drum surfaces. Each of the friction linings 98 is recieved into a recess 99 in the surface of the housing to be flush therewith. It should be recognized that the friction linings, pistons and corresponding ways in the housing need not be cylindrical and, in fact, the rectangular shaped friction lining pads of the embodiment of FIGS. 4 and 5 is more preferred in view of the greater friction lining surface area achieved thereby.

Figure 3:
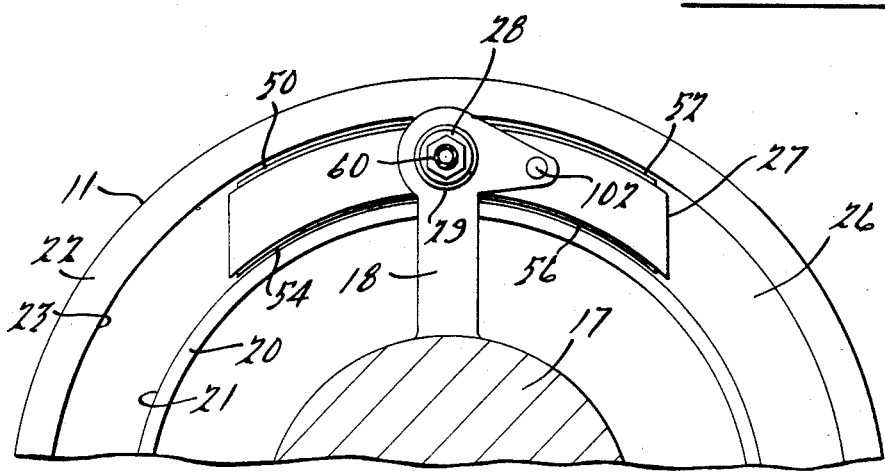
FIG. 3 is a rear elevation view partially in cross-section and partially broken away, of a dual drum brake assembly according to another embodiment of the invention.

In those embodiments wherein a free-floating piston arrangement is used as described above with reference to FIGS. 6 and 7, the surface of the friction lining pads preferably is provided with wedge shaped concavities adapted to aerodynamically bias the friction lining away from contact with the brake drum surfaces upon rotation of the dual drum brake housing. That is, as shown in FIGS. 10 and 11 the friction lining pad 100 provides one or more surface concavities 101. Upon rotation of the dual drum brake housing, an air flow is established over the surface of the friction lining pad, whereby the wedged shape concavities act to aerodynamically bias the friction lining pad toward the brake lining assembly and away from contact with the drum surface. According to one preferred embodiment, a coil spring or the like is provided between each pair of opposed pistons, which spring is adapted to be placed in tension during brake actuation when the pistons move away from each other toward the drum surfaces. Upon cessation of brake actuation, the hydualic pressure within the housing decreases and the spring biases the friction lining pads away from contact with the drum surfaces.

Where an elastomeric expandable bladder is employed, as in the embodiment of FIGS. 4 and 5 and the embodiment of FIGS. 8 and 9, the elastomeric nature of the bladder acts to retract the friction linings upon decrease of the fluid pressure within the bladder. In fact, in those embodiments employing such elastomeric bladder, the expandable friction lining assembly need not be free to rotate relative to the torque member. Thus, referring to FIG. 3, the friction lining assembly 27 can be mounted to the torque member 17 not only by means of an axially extending shank 28 but, in addition, by means of a stabilizing pin 102 between the housing and the end of yoke 18, extending from the torque member at a position circumferentially spaced from the shank 28. Such stabilizing pin will act to prevent flutter of the friction lining assembly within the annular channel between the drum surfaces. Where the above described concave wedges are provided in the surface of the friction lining, the aerodynamic lift provided thereby, both above and below the housing, tends to stabilize the assembly within the annular channel.

While several specific embodiments of the invention have been shown and described in detail to illustrate the principles of the invention, it will be understood that the invention may be embodied otherwise within the scope of the invention as defined by the appended claims.

I claim:

1. A drum brake assembly adapted for selective actuation, said drum brake assembly comprising:
    a rotatably mounted dual drum brake housing comprising two axially extending, concentric, radially spaced drum surfaces defining an annular channel between them;
    a torque member fixed against rotation with said dual drum brake housing; and
    an expandable friction lining assembly adpated to recieve pressurized fluid upon actuation of said drum brake assembly, mounted to said torque member and positioned within said annular channel, comprising radially outward and radially inward facing friction linings, and means responsive to pressurized fluid within said friction lining assembly for moving said friction linings into contact with a corresponding one of said drum surfaces to effect braking, each said friction lining having a surface providing a wedge-shaped concavity adpated to aerodynamically bias said friction lining away from contact with said correpsonding drum surface upon rotation of said dual drum brake housing, said wedge shaped concavity having a bottom sloped from a deep end of the concavity to said surface in a direction of rotation of said drum surfaces.

2. A drum brake assembly according to claim 1, wherein said means for moving of said friction linings comprises a radially expandable, fluid pressure-tight bladder between said inward facing and outward facing friction linings, a fluid pressure conduit adapted to communicate fluid pressure to said bladder, and means for supplying fluid pressure to said conduit upon actuation of said drum brake assembly.

3. A drum brake assembly according to claim 2, wherein said means for supplying fluid pressure comprises a master cylinder having an hydraulic fluid outlet in fluid communcation with said conduit.

4. A drum brake assembly according to claim 2 wherein said means for supplying fluid pressure comprises a pressurized air tank in fluid communication with said conduit.

5. The drum brake assembly according to claim 1, wherein said expandable friction lining assembly comprises a housing mounted to said torque member in fixed position via a rigid shank axially extending between said torque member and said housing.

6. The drum brake assembly of claim 5, wherein said shank is integral with said housing and is rotatably received by said torque member.

7. The drum brake assembly according to claim 5, wherein a stabilizing pin extends axially between said torque member and said housing at a position circumferentially spaced from said shank.

8. The drum brake assembly according to claim 5 wherein said means for radial movement of said friction linings comprises a radially expandable, fluid pressure-tight bladder within said housing between said friction linings and a fluid pressure-tight conduit in fluid communication with said bladder extends axially through said shank.

9. The drum brake assembly according to claim 5, wherein said friction lining assembly comprises radially inward facing and radially outward facing friction linings circumferentially forward of said shank, and radially inward facing and radially outward facing friction linings circumferentially rearward of said shank.

10. The drum brake assembly according to claim 5, wherein said expandable friction lining assembly further comprises:
    an elastically expandable fluid pressure-tight bladder extending circumferentially within a housing from forward of said shank to rearward thereof;
    a radially inner wall and a radially outer wall, each substantially parallel to an adjacent portion of a corresponding one of said drum surfaces, said radially inner wall defining a first way circumferentially forward of said shank and a second way circumferentially rearward of said shank, said radially outer wall defining a first way circumferentially forward of said shank and a second way circumferentially rearward of said shank; and
    a set of support discs, one each of said support discs being positioned in a corresponding one of said ways for reciprocal movement therein substantially orthogonal to the adjacent drum surface, said support discs being substantially rigid and each being attached to said bladder, whereby expansion of said bladder moves said support discs toward the ajdacent drum surface;
    said friction linings comprising a set of friction lining pads, each of said pads being attached to a corresponding one of said support discs for movement therewith into contact with the adjacent drum surface.

11. The drum brake assembly according to claim 10, wherein said housing provides a recess in the surface of said walls surrounding each said way, each said friction lining pad being adapted to seat within a corresponding one of said recesses to be flush with said walls of said housing.

12. The drum brake assembly according to claim 5, wherein said housing of said expandable friction lining assembly further comprises:
   a radially inner wall and a radially outer wall, each substantially parallel to an adjacent portion of a corresponding one of said drum surfaces, said radially inner wall defining a first cylindrical way circumferentially forward of said shank, and a second cylindrical way circumferentially rearward of said shank; and
   a set of piston discs, one each of said piston disc being mounted in a corresponding one of said ways for reciprocal movement therein substantially orthogonal to the adjacent drum surface, each of said piston disc being in fluid pressure tight engagement with the corresponding one of said cylindrical ways, said housing and said piston discs together forming a substantially fluid pressure-tight chamber, whereby communication of fluid pressure into said housing moves said piston discs toward the adjacent drum surface;
   said friction linings comprising a set of friction lining pads, one each of said pads being attached to a corresponding one of said piston discs for movement therewith into contact with the adjacent drum surface.

13. The drum brake assembly according to claim 12, wherein said housing provides a recess in the surface of said walls surrounding each said way, each said friction lining pad being adapted to seat within a corresponding one of said recesses to be flush with said walls of said housing.

14. The drum brake assembly according to claim 12, wherein said friction lining assembly further comprises means for biasing said piston discs away from contact with said drum surfaces.

15. The drum brake assembly according to claim 14, wherein said biasing means comprises a spring mounted to and between said piston discs mounted in said cylindrical ways circumferentially forward of said shank and a second spring mounted to and between said piston discs mounted in said cylindrical ways circumferentially rearward of said shank.

16. The drum brake assembly according to claim 5, wherein said expandable friction lining assembly further comprises an elastically expandable fluid pressure-tight bladder extending circumferentially within said housing from forward of said shank to rearward thereof, said housing having a radially inner wall and a radially outer wall each substantially parallel to an adjacent portion of a corresponding one of said drum surfaces, said radially inner wall defining a first way circumferentially forward of said shank and a second way circumferentially rearward of said shank, and said radially outer wall defining a first way circumferentially forward of said shank and a second way circumferentially rearward of said shank, said friction linings comprising a set of friction lining pads, each of said pads being attached to said bladder at a corresponding one of said ways.

17. The drum brake assembly according to claim 16, wherein said expandable bladder has platform portions of increased thickness, each of said platform portions projecting into a corresponding one of said ways, said friction lining pads being attached to said expandable bladder at said paltform portions.

18. The drum brake assembly according to claim 16, wherein said housing provides a recess in the surface of said walls surrounding each said way, each said friction lining pad being adapted to seat within a corresponding one of said recesses to be flush with said walls of said housing.

19. The drum brake assembly of claim 1, wherein one of said drum surfaces is a first surface of an axially extending annular flange, the opposite surface of which comprises integral cooling fins adapted for dissipating heat generated during braking of said motor vehicle.

* * * * *